United States Patent
Gerlach

(10) Patent No.: US 6,845,337 B2
(45) Date of Patent: Jan. 18, 2005

(54) METHOD FOR CORRECTING THE DETERMINATION OF THE ROTATING POSITION OF A DRIVE SHAFT OF A COMMUTATED DIRECT CURRENT MOTOR

(75) Inventor: Tobias Gerlach, Hagen (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/678,686

(22) Filed: Oct. 3, 2003

(65) Prior Publication Data
US 2004/0111233 A1 Jun. 10, 2004

Related U.S. Application Data

(63) Continuation of application No. PCT/EP02/05280, filed on May 14, 2002.

(30) Foreign Application Priority Data

May 21, 2003 (DE) .......................................... 101 24 615

(51) Int. Cl.[7] ............................. G06F 15/00; G01P 3/00
(52) U.S. Cl. ....................... 702/145; 318/565; 318/286; 702/151
(58) Field of Search ........................ 702/56, 57, 64–66, 702/70–78, 127, 142, 145, 151; 318/138, 254, 439, 565; 361/160; 324/160, 166, 168, 177; 388/814; 417/53; 700/69

(56) References Cited

U.S. PATENT DOCUMENTS 5,524,168 A 6/1996 Macks et al.
5,877,955 A * 3/1999 Struyk .......................... 700/69
6,144,179 A 11/2000 Kessler et al.
6,657,407 B2 * 12/2003 Lutter et al. ................. 318/286

FOREIGN PATENT DOCUMENTS

| DE | 44 12 028 A1 | 4/1994 |
|---|---|---|
| DE | 196 02 362 A1 | 1/1996 |
| DE | 197 29 238 C1 | 7/1997 |
| DE | 198 34 108 A1 | 7/1998 |
| DE | 199 15 877 A1 | 4/1999 |
| EP | 0 730 156 A1 | 1/1996 |

* cited by examiner

Primary Examiner—John Barlow
Assistant Examiner—John Le
(74) Attorney, Agent, or Firm—Brooks Kushman P.C.

(57) ABSTRACT

A method for determining the rotational position of a motor drive shaft includes counting detected ripples contained in a motor current signal as the shaft is driven. Whether a ripple expected to be contained in the current signal at a probable time is absent from within a tolerance band containing the probable time of the expected current ripple is determined. If the expected ripple is absent from within the tolerance band containing the probable time, then whether a ripple is detected after the tolerance band of the expected ripple is determined. If a ripple is detected after the tolerance band and the expected ripple is absent from within the tolerance band, then the expected ripple is counted as a detected ripple. The determined rotational position of the shaft is based on the counted ripples. The length of the tolerance band dynamically changes as a function of a motor operating state.

12 Claims, 2 Drawing Sheets

METHOD FOR CORRECTING THE DETERMINATION OF THE ROTATING POSITION OF A DRIVE SHAFT OF A COMMUTATED DIRECT CURRENT MOTOR

CROSS-REFERENCE TO RELATED APPLICATIONS

This is a continuation of International Application PCT/EP02/05280, published in German, with an international filing date of May 14, 2002, which claims priority to DE 101 24 615.3 filed on May 21, 2001.

BACKGROUND OF THE INVENTION

1. Field of the Invention

The present invention relates to a method for correcting a rotational position determination of the drive shaft of a commutated direct current (DC) motor by evaluating the current ripple contained in the armature current signal when missed ripples occur if no further current ripple is identified within a tolerance band surrounding a defined time point after the last detected current ripple.

2. Background Art

The armature current signal of a commuted direct current (DC) motor includes a direct component and a ripple component superimposed on the direct component. The ripple component arises when the DC motor operates as a consequence of the interaction of the magnet (field), the armature winding, and the commutator of the DC motor. This expresses itself in a short-term change in the induced voltage which produces the ripple component of the armature signal. The current peaks contained in the armature current signal—referred to below as current ripple—occur when the armature rotates. The current ripple has a frequency corresponding to the number of collector bars. For example, if the armature has ten collector bars then the armature current signal has ten identifiable current ripples.

Thus, the number of counted current ripples is indicative of the rotational position of the armature of the DC motor and is thus indicative of the position of the element (such as a window) being driven by the DC motor within a predetermined travel segment. The analog armature current signal is digitized to make it possible to count the current ripples.

However, during the operation of a DC motor, especially under load, it can happen that a current ripple contained in the armature current signal is distorted and is recognizable by two current peaks. These two current peaks are known as double ripples. When such an armature current signal is digitized, the distortion causes the current ripple signal to be recorded with two current ripples in this position instead of one current ripple. If these double ripples are counted then the determined position for the driven element will be erroneous. The same goes for the occurrence of a missed ripple. A missed ripple implies the absence of a current ripple when the shaft of the DC motor actually rotates. These errors are caused by the commutator, and thus are not easily eliminated by conditioning the armature current signal.

U.S. Pat. No. 6,144,179 discloses a measure according to which the counter result of the counted current ripples is only corrected for the absence of an expected current ripple if the current ripple is not identified within a tolerance band surrounding the time point that the current ripple is expected. The tolerance band is fixed. Thus, the disclosed process involves enlarging the calculated probable time point of the next commutation (current ripple) by the size of the specified tolerance band. The absence of a current ripple at or before the expected time point is only identified as a missed ripple if a current ripple also has not been detected within the tolerance band.

This process allows satisfactory ripple detection when the DC motor is in steady-state or quasi steady-state operation, and this ripple detection also provides corresponding correction of missed ripples or double ripples. If a current ripple is detected only later in time than the upper limit of the tolerance band then the system decides that there has been an erroneous absence of a current ripple and makes a corresponding correction in the counter result.

However, during the operation of a DC motor, operating states can occur in which the period length of a current ripple increases (or decreases) abruptly. Such an operating state in which the period length of a current ripple increases occurs, for example, if there is an abrupt increase in load torque. An abrupt increase in load torque may occur, for example, if the motor is operating against a stop. Because in such a situation the current ripple is detected only after the end of the tolerance band, the system may make a false correction in the counter result. Consequently, the position determined for the shaft and consequently, the driven element, will be incorrect. If such events repeat, the counter result becomes increasingly erroneous.

SUMMARY OF THE INVENTION

Starting from the discussed prior art, the present invention is based on the task of further developing the method of the type described above but to avoid, or to reduce as much as possible, the misinterpretation of missed ripples.

The present invention solves this task because the tolerance band—which surrounds the time point when the detection of a current ripple is expected and in which a correction of the counter result is unnecessary—has a size that is dynamically adapted to the changing operating states of the DC motor.

Unlike the prior art, the method according to the present invention does not specify a static or fixed tolerance band. In contrast, the tolerance band is dynamic and is adaptable to respective operating states of the motor. The tolerance band is adaptable to the motor according to the changing operating states of the motor.

For example, assume that the motor is in continuous operation with the tolerance band being adapted to this continuous operation and the continuous operation does not change or only changes minimally. When the motor starts acting against a stop which interrupts the continuous operation and causes the load torque to increase abruptly, the tolerance band is adapted to this changing operation state. In this example, the tolerance band is adapted by being enlarged.

Enlarging the tolerance band means that the current ripple, the period of which is prolonged as a consequence of the changed operating state, will be present in the enlarged tolerance band. Consequently, the counter result corresponds to the number of current ripples actually detected so that even in a changing operating state such as that described the determination of the position of the shaft of the motor and the driven element remains exact.

The tolerance band in which current ripple detection is expected can be enlarged or reduced depending on the changing operating states of the motor.

One embodiment of the present invention adapts the tolerance band as a function of the magnitude of a change in the mean of the digitized armature current signal. This involves enlarging the tolerance band when the mean increases and reducing the tolerance band when the mean decreases. In this embodiment, the tolerance band is adapted as a function of the operating states preceding the current time point. This may involve subdividing changes in the mean into change intervals so that the size of the tolerance band is then adapted in steps. To determine the mean it is sufficient to consider a certain time interval preceding the current time point. The size of the time interval can be selected to be constant to minimize the computing effort or the size can be designed to adapt to the operating state of the motor.

Another embodiment of the present invention allows the tolerance band to be adapted as a function of the magnitude of the change in speed of the motor as calculated from the motor current and characteristic data. The tolerance band is enlarged in the event of a negative change in motor speed. Conversely, the tolerance band is reduced in the event of a positive change in motor speed.

The use of this method is especially suitable in operating states in which the load torque increases abruptly. It is expedient to determine a negative change in motor speed at a time point by calculating the motor speed step response curve for an abrupt rise in the current load torque that is based on the short-circuit torque. This can be used to derive how long the motor speed will still change, i.e., how long the armature shaft will still turn. If there is an abrupt rise in load torque, such as occurs, for example, when the motor is operating against a stop, then the tolerance band is correspondingly enlarged so that the current ripple whose period is prolonged can also be detected if it is within the tolerance band.

The maximum frequency that the calculation cycle can have is once in every sampling interval in which the armature current signal is digitized. In principle this is unnecessary. Instead it is sufficient for a negative change in motor speed to be calculated from the current operating state when there is an abrupt rise in load torque once within a current ripple period, and for it to be extrapolated for the other sampling time points within this current ripple period.

In principle it is possible for different operating states of the motor to use different correction processes and/or for the calculations to be performed more or less frequently depending on the motor operating states or the changing motor operating states. In this connection it is also possible, for example in the method according to the speed-related sample embodiment, for the motor to have a startup phase, in which the complete motor model is performed with the necessary motor current and characteristic data, followed by an operating phase, in which calculating the maximum change in speed when there is an abrupt increase in load torque only involves considering the difference between the actual motor current data and the preceding motor current data. This reduces the calculation effort.

BRIEF DESCRIPTION OF THE DRAWINGS

The present invention is described below using two sample embodiments which make reference to the attached figures. The figures are as follows.

DETAILED DESCRIPTION OF THE PREFERRED EMBODIMENT(S)

Figure 1C:
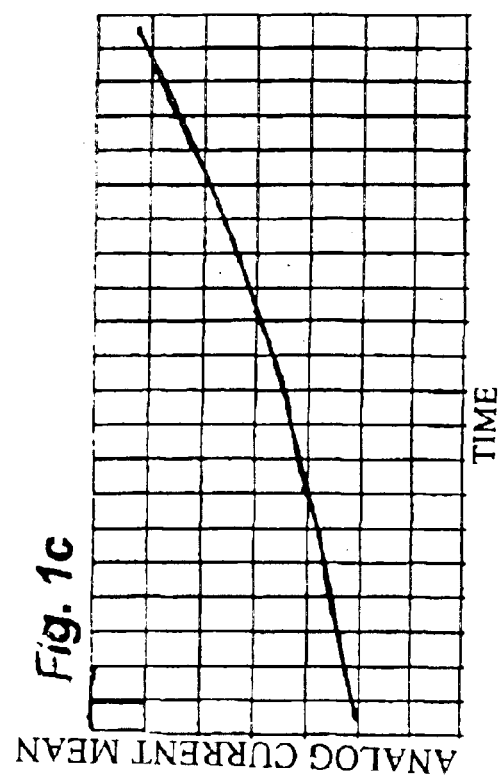
FIGS. 1a–1d illustrate diagrams showing the adaptation of the tolerance band to avoid misinterpretation of missed current ripples by calculating the mean of the armature current signal.
Figure 1D:
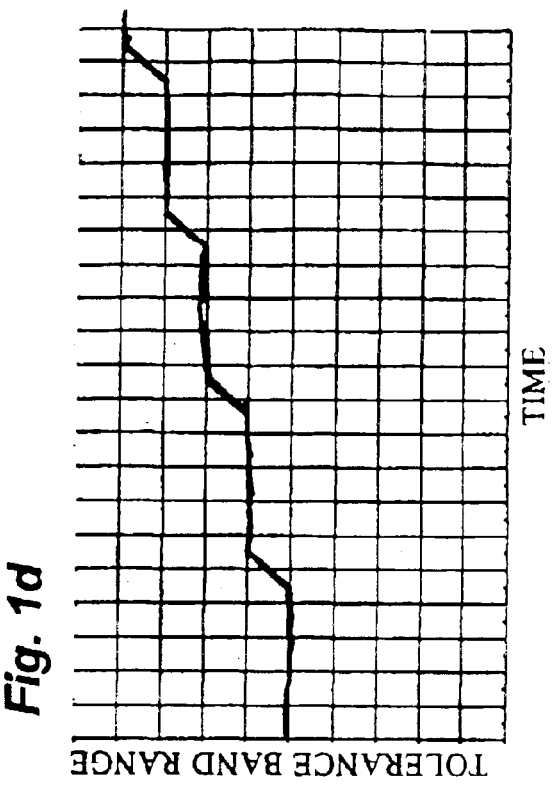
Figure 1A:
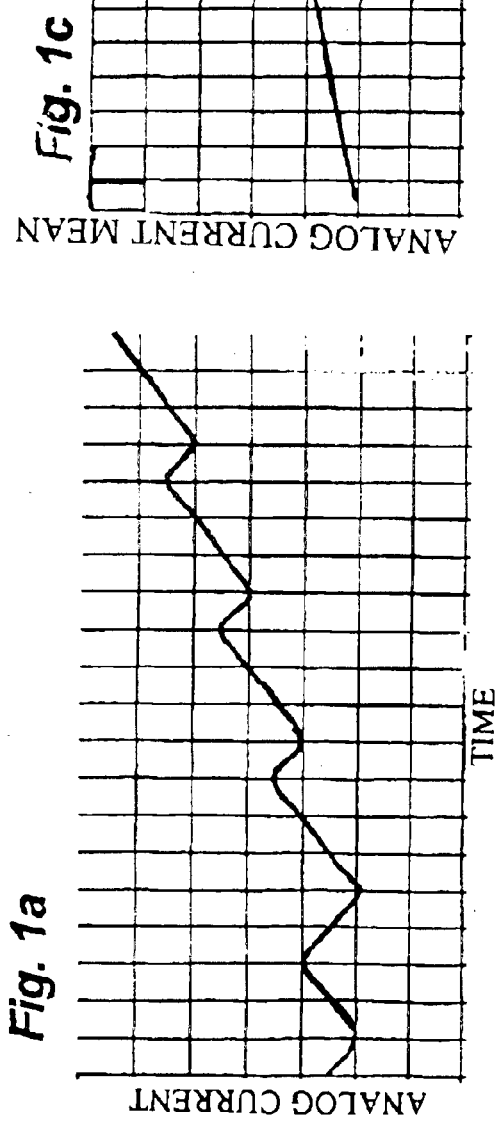

FIG. 1a illustrates the behavior of an analog armature current in a graph in which the Y-axis represents the analog armature current and the X-axis represents time. To determine the behavior of the mean of this analog current signal, the analog current signal is first sampled according to a specified cycle. The digitized armature current signal is reproduced in FIG. 1b. The next step is to form the mean from the digitized current signal. This is done at every point by using a certain number of preceding values of the digitized current signal. FIG. 1c illustrates the behavior of the mean of the armature current signal.

Figure 1B:
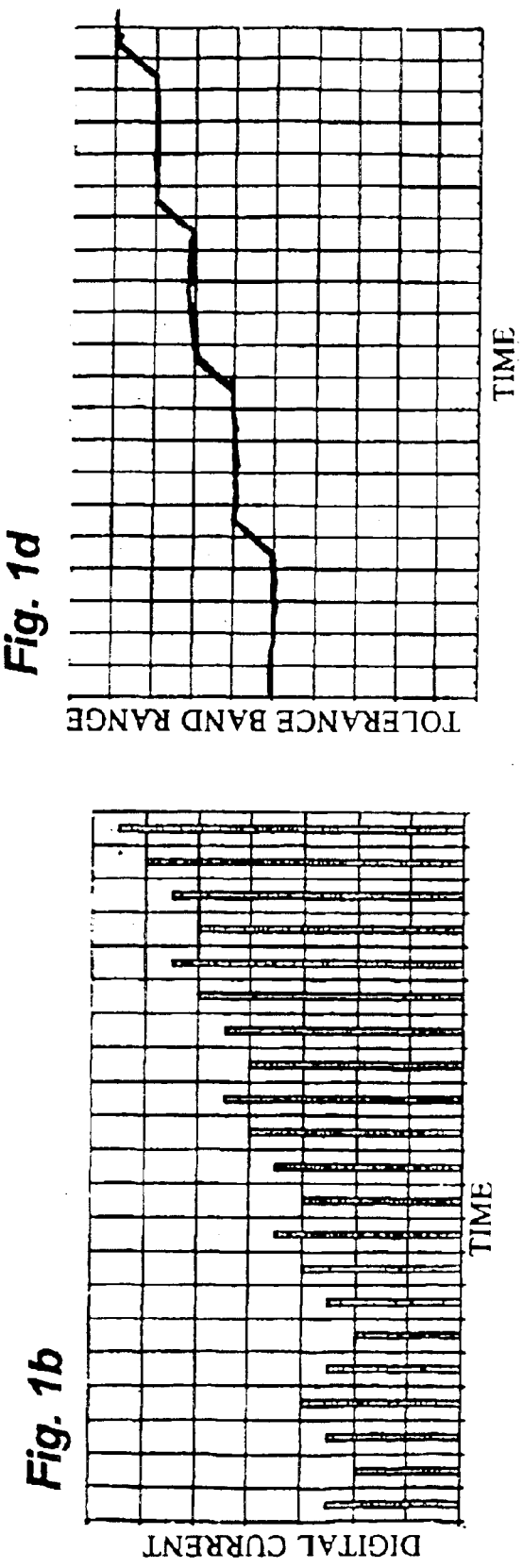

FIGS. 1a, 1b, and 1c are graphical representations of the operating state of a commutated direct current (DC) motor when the motor is acting against a stop. For example, if the motor is one that is used to raise a motor vehicle window, then this operating state occurs when the window is closed which occurs when the motor pushes the window into its frame. The corresponding operating state also occurs in a situation when something is caught in the window.

In such a motor operating state, the armature current signal increases due to the increased current consumption and this is expressed in the rising behavior of the mean of the armature current signal as shown in FIG. 1c. Thus, a change in the mean of the armature current signal reflects changing operating states in the motor, as is noticeable, in the exemplary described operating state, from the rise in the mean of the armature current signal.

Therefore, the behavior of the mean of the armature current signal can be used to specify, as a function of the change in the mean, a tolerance band used for avoiding misinterpretation of missed current ripples. In this way, the tolerance band, which is added to the expected time point when current ripple detection is expected, can be adapted to changing operating states to avoid a misinterpretation of undetected current ripples.

FIG. 1d illustrates how this tolerance band is increasingly enlarged in the sample operating state, rising from a value of 25% up to a value of 45%, as a consequence of the change in the operating state. The enlarged tolerance band now makes possible proper current ripple detection with an abruptly changed period, even if the current ripple detection is not detected until later than was initially predicted.

The method according to the present invention involves making a correction to the actually captured current ripple result if a current ripple is not detected within the tolerance band adapted to the operating state. The setting of the adaptive tolerance band takes into account abruptly changing current ripple periods, so non-detection of a current ripple within the tolerance band means that a current ripple is actually not identified then, and it is necessary to correct the counter result.

Figure 2:
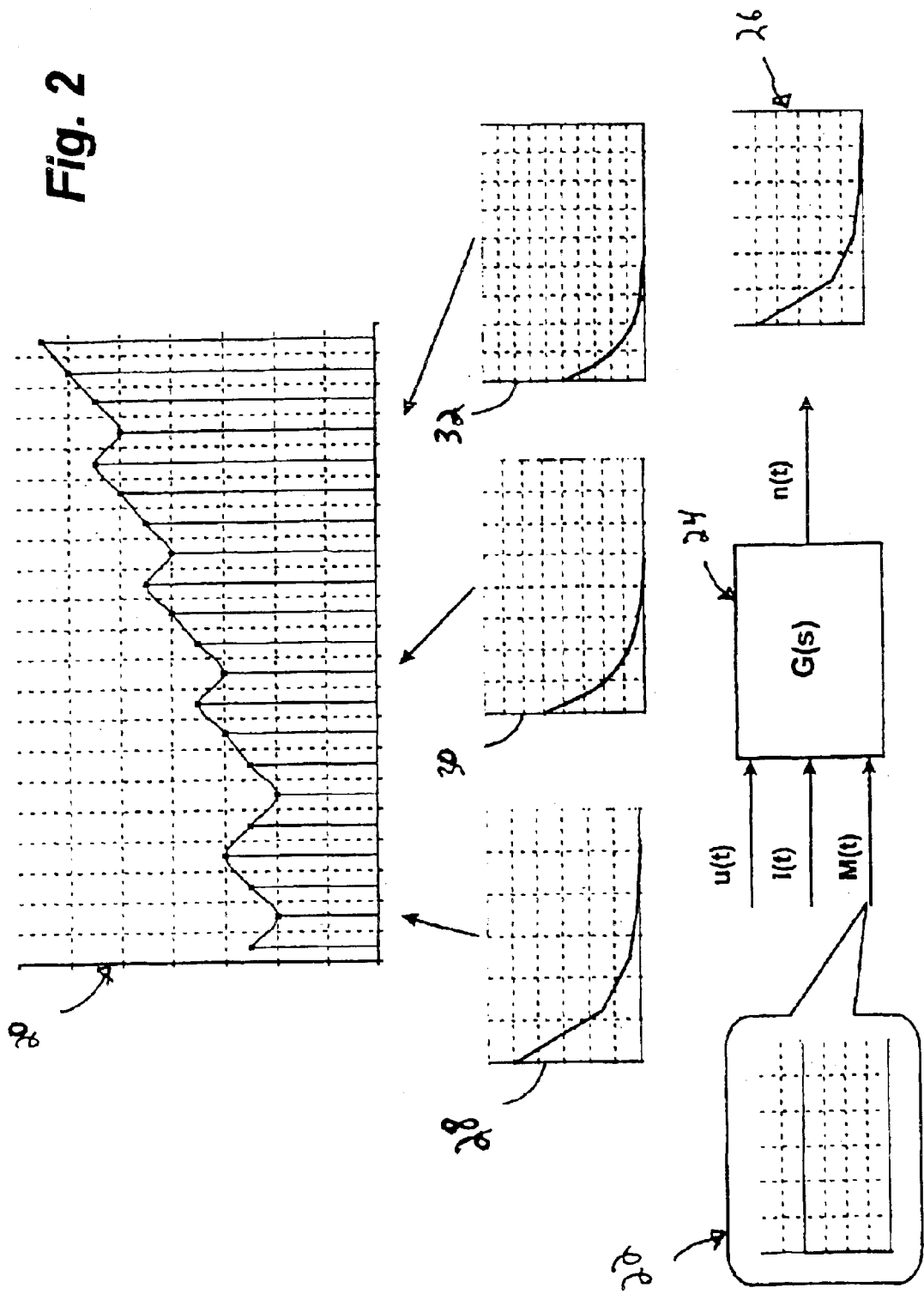
FIG. 2 illustrates diagrams showing the adaptation of the tolerance band to avoid misinterpretation of missed current ripples using a calculated change in motor speed.

FIG. 2 illustrates diagrams corresponding to another sample embodiment for adapting the tolerance band for current ripple detection as a function of changing motor operating states. The topmost diagram 20 corresponds to that of FIGS. 1a and 1b of the other embodiment; the digitally sampled values of the analog armature current signal being marked on this curve with small boxes.

The variable used to adapt the tolerance band in this embodiment is the maximum change in motor speed calculated from the motor current and characteristic data when there is an abrupt rise in the load torque acting on the motor, such as can be the case if the motor is a motor vehicle window raising motor and something gets caught in the window when it is closing. Because this calculation uses the current motor current data, a different maximum speed change can be calculated at different time points in the armature current signal.

For example, the bottom row of illustrations in FIG. 2 show this calculation. The current motor current data— which in this case means the voltage u(t), the current i(t), and the load torque M(t)—is used to calculate the motor speed change n(t), taking into consideration the motor characteristic data which is referred to as a transfer function G(s) as represented by block 24. The result represents the calculated maximum motor speed change, which is shown as diagram 26 in the bottom row of FIG. 2.

The illustration 22 of the load torque M(t), which affects the calculation, makes it clear that this embodiment's calculation assumes an abrupt rise in the current load torque, which would be set to the maximum short-circuit torque. Of course other load torque-dependent models could also enter in here. The shape of the curve of the calculated maximum speed change is then used to adapt the tolerance band for the current ripple detection. If there is a rapid negative change in speed the tolerance band is correspondingly enlarged.

The middle set of diagrams 28, 30, and 32 in FIG. 2 shows the motor speed change curves which result when such a calculation is performed, using the respective minima of the armature current signal as examples. The curve of the behavior of the tolerance band which is derived from these curves is not shown in FIG. 2. However, the behavior of the tolerance band essentially corresponds to the behavior of the tolerance band in FIG. 1d.

This method can involve calculating the maximum motor speed change at specified time points, as is shown in the sample embodiment in FIG. 2, in which such a calculation is performed at every second minimum as shown by the middle set of diagrams 28, 30, and 32. Depending on what calculation power is available, this calculation can also be performed more frequently during the course of the armature current signal.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for determining the rotational position of the drive shaft of a direct current motor, the method comprising:
    detecting current ripples contained in an armature current signal of the motor as the drive shaft of the motor rotates in response to being driven by the motor;
    counting the detected current ripples;
    determining whether a current ripple expected to be contained in the armature current signal at a probable time point is absent from within a tolerance time band containing the probable time point of the expected current ripple;
    if the expected current ripple is absent from within the tolerance time band containing the probable time point of the expected current ripple, then determining whether a current ripple is detected after the tolerance time band of the expected current ripple;
    if a current ripple is detected after the tolerance time band of the expected current ripple and the expected current ripple is absent from within the tolerance time band, then counting the expected current ripple as a detected current ripple;
    determining the rotational position of the drive shaft based on the counted current ripples; and
    dynamically changing the length of the tolerance time band as a function of an operating state of the motor as the motor drives the drive shaft.

2. The method of claim 1 wherein:
    the length of the tolerance time band is dynamically changed as a function of a change in the mean of the armature current signal, wherein the length of the tolerance time band is enlarged when the mean of the armature current signal increases and is reduced when the mean of the armature current signal decreases.

3. The method of claim 2 further comprising:
    determining the mean of the armature current signal by taking into account a constant time interval preceding the probable time point of the expected current ripple.

4. The method of claim 2 further comprising:
    determining the mean of the armature current signal by taking into account a time interval preceding the probable time point of the expected current ripple, wherein the length of the time interval depends on the operating state of the motor.

5. The method of claim 2 wherein:
    the length of the tolerance band is changed in steps.

6. The method of claim 2 further comprising:
    digitizing the armature current signal;
    wherein the mean of the armature current signal is determined from the digitized armature current signal.

7. The method of claim 1 wherein:
    the length of the tolerance time band is dynamically changed as a function of a change in motor speed, wherein the length of the tolerance time band is enlarged when the motor speed decreases and is reduced when the motor speed increases.

8. The method of claim 7 further comprising:
    determining a negative change in motor speed by calculating a speed step response curve for an abrupt rise in motor torque based on maximum short-circuit torque to determine the maximum length of the tolerance time band.

9. The method of claim 7 further comprising:
    digitizing the armature current signal in sampling intervals;
    wherein the negative change in speed is calculated in every sampling interval in which the armature current signal is digitized.

10. The method of claim 7 further comprising:
    calculating the negative change in motor speed once within a period of a current ripple for a given time point; and
    extrapolating the negative change in motor speed for other time points based on the negative change in motor speed for the given time point.

11. The method of claim 7 wherein:
    the motor has a start-up phase in which the change in motor speed is determined using motor current and characteristic data, the motor has an operating phase after the start-up phase in which the change in motor speed is determined from the difference between current motor current data and motor current data preceding the current motor data.

12. The method of claim 1 wherein:
    the operating state of the motor includes shut-down and start-up motor operating states.

* * * * *